United States Patent [19]

Winter et al.

[11] Patent Number: 4,580,874

[45] Date of Patent: Apr. 8, 1986

[54] OPTICAL FIBER CABLE REPAIR AND JOINING TECHNIQUE AND KIT FOR PERFORMING THE SAME

[75] Inventors: Joseph Winter, New Haven; Martin H. Dempsey, Stratford, both of Conn.

[73] Assignee: Olin Corporation, New Haven, Conn.

[21] Appl. No.: 508,174

[22] Filed: Jun. 27, 1983

[51] Int. Cl.⁴ ............................................. G02B 6/38
[52] U.S. Cl. ............................. 350/96.21; 350/96.23
[58] Field of Search .............. 350/96.20, 96.21, 96.22

[56] References Cited

U.S. PATENT DOCUMENTS

| 4,168,108 | 9/1979 | Judeinstein | 350/96.22 |
| 4,348,076 | 9/1982 | Oldham | 350/96.22 |
| 4,367,917 | 1/1983 | Gray | 350/96.23 |
| 4,375,720 | 3/1983 | Bourget | 29/869 |
| 4,379,614 | 4/1983 | Liertz | 350/96.21 |

FOREIGN PATENT DOCUMENTS

| 54-11753 | 1/1979 | Japan . | |
| 0089708 | 7/1981 | Japan | 350/96.2 |
| 55-133707 | 10/1981 | Japan . | |

*Primary Examiner*—John Lee
*Assistant Examiner*—Lester Rushin, III
*Attorney, Agent, or Firm*—Barry L. Kelmachter; Howard M. Cohn; Paul Weinstein

[57] ABSTRACT

A method for repairing or joining together optical fiber cables is described herein that uses a ferrule to connect two optical fiber cable lengths. Each cable length comprises a metal tube containing one or more optical fibers and a filler material. The ferrule is placed in overlapping relationship with each tube and a lap joint is effected between the ferrule and each tube. An outer sleeve having a length substantially equal to a gap between the tubes is formed about the ferrule and is bonded to each tube. The outer sleeve preferably has an outer periphery substantially corresponding to the outer periphery of the tubes so that the joined cable has a substantially continuous surface. A kit for performing the method is also described.

32 Claims, 6 Drawing Figures

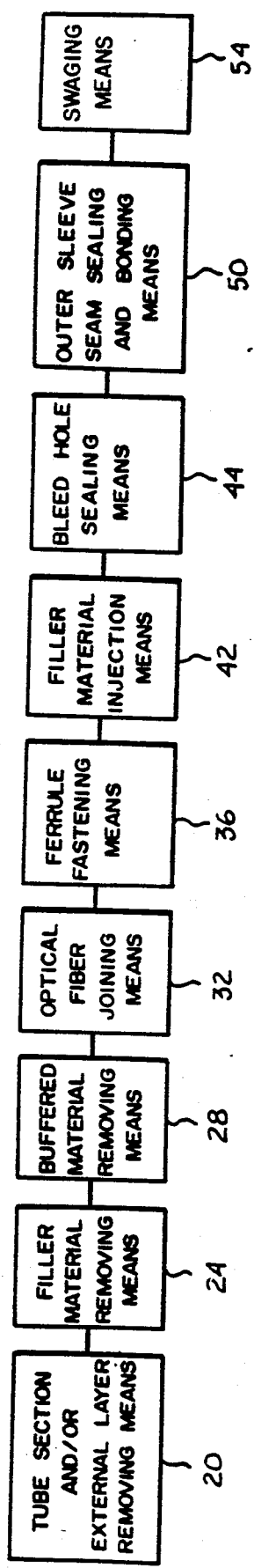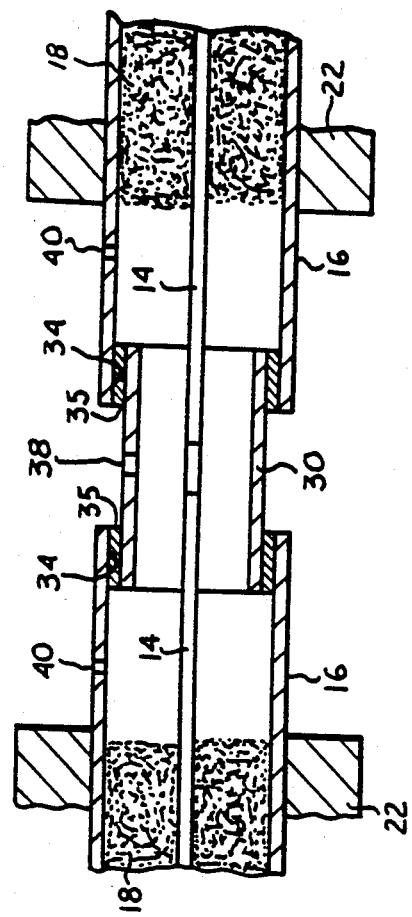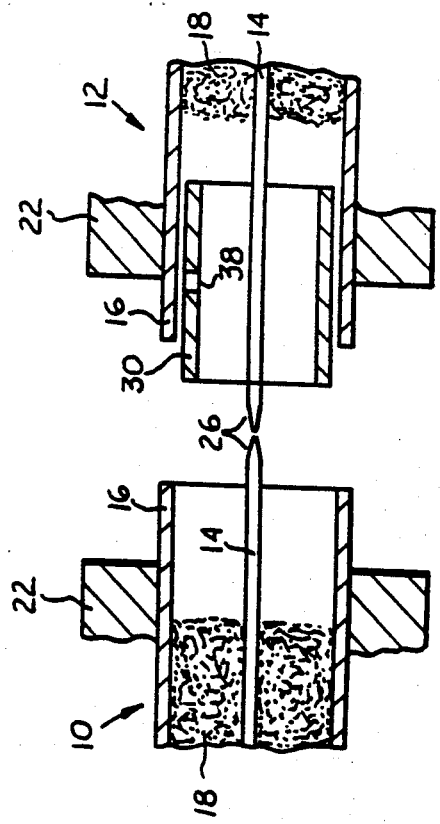

OPTICAL FIBER CABLE REPAIR AND JOINING TECHNIQUE AND KIT FOR PERFORMING THE SAME

The present invention relates to a process for repairing or joining together optical fiber cables and a kit for performing the same.

Because of such advantages as low loss, a relatively light weight and a relatively wide transmission band, optical fiber cables are becoming widely used in a variety of communication applications. In the past, the construction of the cable often depended upon its application. Recently there has been developed an optical fiber cable construction which has applicability in any number of undersea, underground and aboveground applications. This cable construction comprises a core assembly in which one or more buffered glass fibers are encapsulated inside a metal or metal alloy containment tube and one or more protective layers formed from suitable plastic type materials surrounding the core assembly. The growing interest in this type of cable is due in large part to the variety of roles which the containment tube can play. For example, it may act as a strength member, an electrical conductor for supplying power to repeaters or sensors placed at intervals along the length of the cable, and/or a fluid barrier. In undersea applications, the tube may house an appropriate filler material, such as a mixture of rubber, polyethylene and/or at least one hydrocarbon, to further resist the ingress of water and to cushion the optical fiber or fibers.

The main deficiency of optical fiber cables has been their fragility. It is not uncommon for an optical fiber to break during use. Similarly, it is not uncommon for an optical fiber and/or the containment tube to break or otherwise become damaged during manufacture of the cable. It, therefore, becomes desirable to have a readily available and relatively simple technique for repairing damaged or broken cables.

Another deficiency of many optical fiber cables is that they can only be manufactured in limited lengths. Where extremely long lengths of cable are needed, this means that several lengths of cable have to be joined together. It, therefore, also becomes desirable to have a readily available and relatively simple technique for joining together lengths of cable.

Various techniques for repairing and/or joining cable constructions are known in the prior art. In one such technique for joining cables, the ends of the cables to be joined together are first reduced in diameter by using a swaging technique. Then a portion of each end is removed to reveal the conductors to be joined together. After the conductors have been suitably joined together, a longitudinally slotted length of tubing is placed around the exposed joined conductors. The tubing is filled with a suitable insulation material such as powdered mineral insulation by inserting the insulation material into the tubing through the slot. The length of tubing is then closed by welding and connected to the cable ends by welding or brazing. The entire joint is then drawn down about the conductor joint to provide the joined cables with a substantially uniform outside diameter. U.S. Pat. No. 4,375,720 to Bourget illustrates this technique.

In a second technique, a pair of cable segments are spliced together by first trimming back a portion of a metal jacket from an end of each segment and removing any insulation therein to expose the conductor of conductors. Each metal jacket is trimmed so that when they are later joined, a window area will be left open about the splice joint. After the conductor or conductors have been spliced together, the trimmed metal jackets are joined together by welding or soldering. A suitable insulation such as a mineral insulation is poured or inserted into the spliced cable segments through the window area. Thereafter, the window area is covered by a shaped segment of metal which is welded into place to form a splice joint having substantially the same diameter as the cable segments. This technique is illustrated in U.S. Pat. No. 4,367,917 to Gray.

One deficiency of these two techniques is their reliance upon a butt welding technique to join the connecting tubing or the shaped metal segment to the cable tube ends or segments. Butt welds generally have a tensile strength lower than the tensile strength of the metal forming the cable tube or jacket. As a result, where the metal tube is required to function as a strength member, these welds could be a weak link that ultimately leads to tube and/or cable failure.

Yet another technique for splicing together a pair of optical fiber cables is illustrated by U.S. Pat. No. 4,379,614 to Liertz. In this technique, at least one metal tube is positioned to bridge the gap between the ends of a pair of nonmetallic, synthetic material tubular sheaths housing one or more optical fibers. The splice may be made using either an inner tube, an outer tube or both an inner and an outer tube. Where only one tube is used, an adhesive can be used to secure the tube to each sheath. Where both inner and outer tubes are used, the tubes can be fixed in place either by applying an adhesive or by shrinking the outer tube onto the tubular sheaths and the inner tube. To avoid thickening of the cable at the splice joint, Liertz suggests using an outer tube with a longitudinally extending slot that enables the outer tube to be pressed and constricted onto the tubular sheaths. The constriction of the outer tube onto the tubular sheath causes a reduced neck portion in each sheath and/or the inner tube. The reduced neck portion or portions caused by this technique may decrease the overall strength of the connection. In addition, the pressing and constriction of the outer tube could damage the optical fiber or fibers within the tubular sheaths such as by creating bends or microkinks that raise attenuation.

In accordance with the present invention, a method for repairing or joining together lengths of optical fiber cables that is relatively simple to perform is provided. Using the method described herein, a repair patch or joint connection may be effected that does not derate the mechanical and/or electrical conductivity properties of a metal or metal alloy component of the cable. In some instances, the repair patch or joint connection may be as strong or stronger than the original cable construction.

The repair and joining method of the present invention is applicable to most any optical fiber cable having at least one optical fiber housed within a metal tube such as a metal or metal alloy containment tube. When used to repair an optical fiber cable having one or more broken or damaged optical fibers, the method of the instant invention may be carried out as follows: First, the optical fiber or fibers and any broken fiber ends are exposed by removing a section of the surrounding metal tube. Any filler material surrounding the exposed optical fiber or fibers and some filler material from each length of tube are then removed. After the fiber or fibers and any broken ends have been fully exposed, some of the buffer material surrounding the broken fiber or fibers is removed to provide clean ends suitable for splicing. The clean fiber ends are then joined together using a suitable splicing technique. Prior to the fiber ends being spliced together, a hollow metal tubular member or ferrule is inserted into one of the metal tubes. After the fiber splice or splices has been effected, the ferrule is partially withdrawn from the metal tube and placed into an overlapping relationship with each tube. Thereafter, the ferrule is mechanically fastened to each tube and any void inside the joined tubes caused by removal of some of the filler material in each tube is substantially filled with a suitable filler material. As a final step, an outer sleeve is fabricated about the portion of the ferrule not in overlapping contact with each tube.

The same method may also be used to join together two lengths of optical fiber cable. However, if each optical fiber extends from the surrounding tube a sufficient length to effect a splice joint, then the step of removing part of the surrounding metal tube from about the fiber or fibers may be omitted.

In performing the method of the instant invention, the ferrule preferably has an outer diameter slightly less than the inner diameter of the tube or tubes into which it is inserted. In addition, it has a length that is about ½" to about 2" greater than the total length of the joined, exposed fiber or fibers.

Since the ferrule forms the major component of the patch or joint devised by the instant invention, the material forming the ferrule is quite important in that is should meet certain rigidity and/or conductivity standards. For example, since the repair patch or connection joint preferably has a tensile strength substantially equal to or greater than the tensile strength of the cable tube material, the ferrule material should possess a tensile strength substantially equal to or greater than the cable tube material. Where the ferrule is to function as part of an electrical conductor, the ferrule material should also possess an electrical conductivity substantially equal to or better than the cable tube material conductivity. The ferrule material must also be readily bondable to the tubes. In a preferred embodiment, the ferrule is made from a high strength copper alloy. For certain applications, the ferrule may be made of steel or stainless steel tubing.

To facilitate insertion of a filler material into the ferrule to fill any void in the patch or joint area, the ferrule is preferably provided with a feed hole in one of its sidewalls. The feed hole may be drilled into the ferrule either before the ferrule's insertion into the tube or after the ferrule has been fastened in place. In a preferred manner of performing the method of the instant invention, a bleed hole is drilled into at least one of the tubes, and preferably both of the tubes, adjacent the joint or patch area. The bleed hole permits air from inside the patch or joint area to escape and substantially prevents the formation of air bubbles in the replacement filler material. The replacement filler material is preferably inserted into the ferrule and the tubes through the feed hole. After any void has been substantially eliminated, the feed hole and/or the bleed hole or holes may be closed in an appropriate manner. The outer sleeve should effectively seal the feed hole in the ferrule.

In performing the instant invention, the fiber ends may be joined together using any conventional splicing technique in the art. Suitable splicing techniques include fusion bonding, adhesive bonding, and bonding with mechanical connectors.

Any suitable technique known in the art may be used to mechanically fasten the ferrule to each tube. However, in a preferred embodiment, the ferrule is fastened to each tube by use of either a solder, a brazing material or a conductive epoxy. Preferably, the selected fastening technique causes a suitable sealing material to flow into the intersurface region between each tube and the ferrule and form a lap joint.

To form an outer sleeve about the ferrule, a split metal tube having a longitudinal seam is fitted about the ferrule. After being placed into position, the seam is closed such as by soldering, brazing, welding or some other suitable technique and the sleeve fastened to each tube by a suitable fastener such as solder or epoxy. The outer sleeve preferably has an outer diameter substantially equal to the outer diameter of the tubes and a length substantially equal to the gap between the tubes. If needed, the outer sleeve may be reduced in size such as by swaging so that its outer diameter is substantially the same as the outer diameter of the tubes. Where the outer sleeve is to function as part of an electrical conductor, it should be formed from a material having an electrical conductivity substantially equal to or greater than the cable tube material.

In lieu of a metal tube, the outer sleeve may comprise a formed, nonmetallic coating or a metal or metal alloy tape wrapped about the ferrule. Of course, the nonmetallic coating could only be used where the outer sleeve does not function as part of an electrical conductor.

After the repair patch or connection joint has been effected, the repaired cable or joined cable lengths may have one or more external layers fabricated thereabout.

In accordance with the instant invention, a kit for repairing a broken or damaged optical fiber cable and for joining together a plurality of optical fiber cable lengths includes means for removing a section of a metal tube housing one or more optical fibers, means for splicing the optical fibers together, a metal or metal alloy ferrule, means for injecting a filler material into the ferrule and the metal tubes, an outer sleeve, and means for fastening the ferrule and the outer sleeve to each metal tube. The ferrule may have a predrilled feed hole in one sidewall or the kit may be provided with means for drilling a feed hole in the ferrule and/or at least one bleed hole in each cable tube. The kit may also include means for swaging the outer sleeve, if needed, means for holding the cable tubes in a fixed position, and means for removing any filler material and/or buffer material from about the optical fiber or fibers.

Accordingly, it is an object of the present invention to provide a method for repairing or joining together optical fiber cables.

It is a further object of the present invention to provide a method as above that is relatively simple to perform.

It is a further object of the present invention to provide a method as above that does not derate the optical properties of the optical fiber or fibers and the mechanical and/or electrical conductivity properties of any metallic containment tube in which the fiber or fibers may be housed.

It is a further object of the present invention to provide a kit for performing the above method.

These and other objects will become more apparent from the following description and drawings in which like elements have been given like reference numbers.

FIG. 1 is a schematic representation of an apparatus for performing the method of the instant invention for repairing or joining together optical fiber cables.

FIG. 2 is a cross-sectional view of a pair of optical fiber cables or cable portions to be joined together or patched.

FIG. 3 is a cross-sectional view of the cables or cable portions of FIG. 2 in which a ferrule has been moved into position to bridge the gap between the cables or cable portions.

Figure 6:
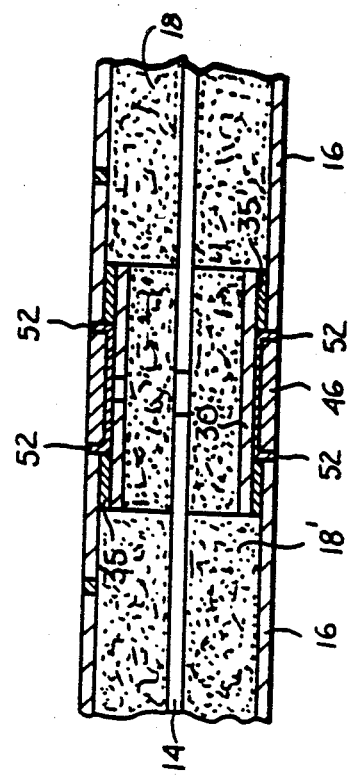
FIG. 6 is a cross-sectional view showing a connection joint or a repair patch in accordance with the present invention.

In accordance with the present invention, it is proposed to provide a method for repairing or joining together optical fiber cables having at least one metal or metal alloy tube surrounding one or more optical fibers. It is further proposed that the repair patch or connection joint fabricated by the method of the present invention does not derate the mechanical and electrical conductivity properties of the original cable construction and the optical properties of the optical fiber or fibers.

The method of the present invention is accomplished by mechanically joining a metallic tubular sleeve or ferrule to each cable portion or length to be joined together. The ferrule is preferably formed from a material that has mechanical and/or electrical conductivity properties substantially equal to or better than those of the metal tube or tubes in which the optical fiber or fibers are housed.

Referring now to the drawings, two optical fiber cable portions 10 and 12 to be joined together are illustrated. The cable portions 10 and 12 may be two lengths of virgin cable to be joined together or they may come from a single cable construction in which an optical fiber 14 has become damaged or broken. Each cable portion generally has a metal or metal alloy containment tube 16 in which at least one optical fiber 14 and a filler material 18 are housed.

If the cable portions 10 and 12 come from a single cable construction having a damaged or broken optical fiber, they may be formed by first removing in the area in which the repair patch is to be made any external layers not shown surrounding the tube 16.

After the tube 16 has been laid bare, a section of the tube 16 is removed to expose the damaged fiber area or the broken fiber ends. Any suitable means 20 known in the art, such as a razor blade and/or a pipe cutting tool, may be used to remove any external layers and the tube section. In a preferred manner of performing the method of the present invention, enough of the tube 16 is removed that about 1" to about 4", most preferably from about 2" to about 3", of undamaged fiber 14 extends from each of the cable portions 10 and 12.

If the cable portions 10 and 12 are virgin cables, the joining method of the present invention is preferably performed prior to the fabrication of any external layers. Each virgin length of cable should have about 1" to about 4" and preferably from about 2" to about 3" of fiber 14 extending from the end or ends to be joined together. If necessary, the containment tube 16 in one or more of the portions 10 and 12 may be trimmed back using a suitable tube cutting device 20 to expose the desired length of optical fiber 14. If there is no need to trim the tube 16 in either cable portion 10 or 12, the tube cutting device 20 may be omitted.

After the cable portions 10 and 12 with the exposed fiber ends 26 have been prepared, each portion is preferably placed in a suitable holding device 22 such as a vise, a clamp or the like. Each cable portion should be placed in the holding device 22 without substantially any twist in its metal tube 16.

In performing the repair or joining method of the present invention, it is necessary to have a substantially clean internal tube area adjacent the location where the repair patch or connection joint is to be made. As a result, the filler material 18 in the vicinity of the repair patch or connection joint location should be removed. Preferably, enough filler material 18 is removed that a ferrule 30, which will be described more fully hereinafter, may be completely inserted into each tube 16. The filler material 18 may be removed using any suitable means 24 known in the art. For example, the filler material removing means 24 may comprise a swab or a reaming device. In some situations, the filler material removing means could comprise the ferrule 30.

After the filler material has been removed, the fiber ends 26 should be prepared to be spliced together. Depending upon the fiber splicing technique utilized, it may be desirable to remove a portion of any buffer material surrounding the fiber ends 26. The buffer material may be removed using any conventional means 28 known in the art such as a knife or a razor blade. For splicing most fibers, from about 1" to about 3", preferably about 2", of buffer material should be removed from each fiber end 26.

Prior to bonding the fiber ends 26 together, a hollow cylindrical tubular member or ferrule 30 is inserted in one of the cable portions 10 or 12. The ferrule 30 is inserted about the fiber or fibers 14. The ferrule 30 should extend a sufficient distance into the tube 16 that enough of each fiber 14 remains exposed to effect splicing of the fibers.

The ferrule possesses an outer diameter that enables it to be inserted or fitted in each tube 16. Preferably, the ferrule's outer diameter is slightly less than the inner diameter of the tube 16. Preferably, the ferrule's outer diameter is about 0.01" less than the tube inner diameter. By doing this, there will be a slight gap between the ferrule 30 and the tubes 16 when they are placed in overlapping relationship. The reason for the gap will be discussed hereinafter.

The fiber ends 26 may be spliced together by any suitable fiber joining means 32 known in the art. For example, the ends 26 may be joined by fusion bonding, adhesive bonding or epoxying an appropriate mechanical connector in place. After the fiber ends 26 have been spliced, the fiber joint area may be coated with an appropriate buffer material not shown.

Referring now to FIG. 3, after the fiber splice has been completed, the ferrule 30 is moved over the fiber joint and into an overlapping relationship with each tube 16. The ferrule 30 should have a sufficient length that a suitable overlap or intersurface region 34 is created between the ferrule 30 and each tube 16. Preferably, the ferrule 30 has a length that is about ½" to about 2" greater than the total length of the exposed joined fibers 14. In a most preferred embodiment, the ferrule 30 has a length that is about 1" longer than the total length of the exposed joined fibers 14.

In performing the method of the instant invention, it is quite important that the ferrule 30 be fabricated from a material possessing certain strength and electrical conductivity properties. For example, since the ferrule 30 is intended to provide strength, the ferrule material preferably possesses a tensile strength substantially equal to or greater than the tensile strength of the material forming the tubes 16. By forming the ferrule 30 from such a material, it is possible for the repair patch or connection joint formed by the method of the instant invention to have a strength as strong as or stronger than the original cable construction. Where the tubes 16 act as an electrical conductor and the ferrule 30 is the only metal component joining the tubes, the ferrule material should also possess an electrical conductivity substantially equal to that of the material forming tubes 16. The ferrule material should also be bondable to the tubes 16. Preferably, the ferrule 30 is formed from a relatively high strength material such as steel, stainless steel and high strength copper alloys including but not limited to C.D.A. Copper Alloys 63800, 65400, 68800 and 51000.

After the ferrule 30 has been correctly positioned, it should be fastened to each tube 16. Any suitable fastening technique known in the art may be used to fasten the ferrule 30 to the tubes 16. Preferably, the ferrule 30 is mechanically fastened to each tube 16 through the use of a suitable sealing material 35 such as a solder, a brazement, or a conductive epoxy. The sealing technique utilized should cause the sealing material 35 to flow into the gap between the ferrule 30 and the tube 16 so that a lap joint is created. In a preferred embodiment, the ferrule 30 is soldered to each tube 16. If desired, the ferrule 30 may be coated with a sealing material not shown compatible with the sealing material 35 to improve the strength of the joint. For example, some or substantially all of the ferrule's outer surface may be coated with a suitable solder material such as 60% tin-40% lead solder. Any conventional means 36 known in the art may be used to fasten the ferrule 30 to each tube 16.

Figure 4:
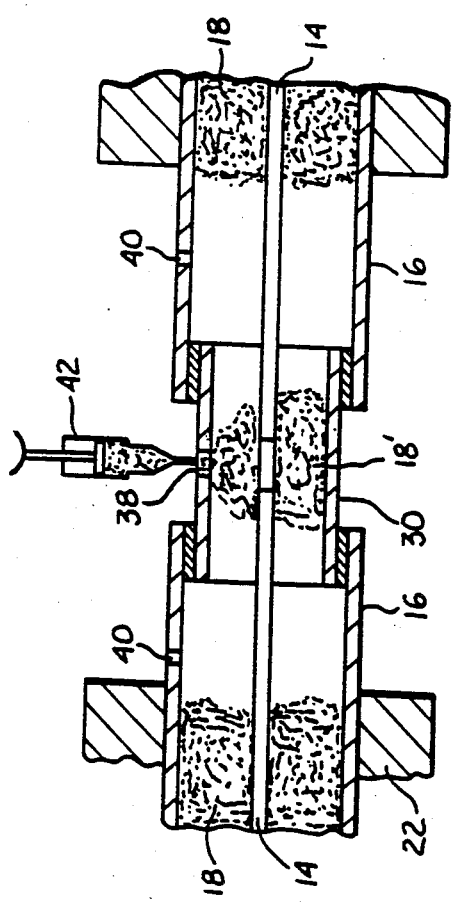
FIG. 4 is a cross-sectional view depicting a method for inserting a suitable filler material into the cables or cable portions and the ferrule of FIG. 3.

So that the completed cable has substantially uniform properties and construction throughout, it is desirable to eliminate the voids created by removing some of the filler material 18 from the tube 16. It is also desirable to surround the spliced fibers inside the ferrule 30 with a suitable filler material. Referring now to FIG. 4, to this end, the ferrule 30 is preferably provided with a feed hole 38 in one of its sidewalls. The feed hole 38 may be drilled into the ferrule either prior to ferrule insertion into one of the tubes 16 or after the ferrule 30 has been fastened to the tubes 16. Preferably, the edges of the drilled feed hole 38 are deburred and rounded after drilling.

The feed hole 38 is used to introduce the replacement filler material 18' into the ferrule 30 and the tubes 16. Any suitable means 42 known in the art such as a hypodermic syringe may be used to inject the replacement filler material 18' into the joined tubes 16 and the ferrule 30. The replacement filler material 18' may comprise any suitable void filler known in the art such as a gel or a long chain polyethylene material.

So that air inside the ferrule 30 and the tubes 16 may escape, at least one of the tubes 16 should be provided with a bleed hole 40. Preferably, each tube 16 has at least one bleed hole 40. The bleed holes 40 may be formed by drilling at least one hole in each tube. After drilling, the inside edge of each hole should be deburred and rounded. The provision of a bleed hole or holes 40 substantially prevents the formation of air bubbles in the replacement filler material 18'. In addition, the bleed hole or holes act as indicators for detecting when the voids have been eliminated. If the replacement filler material 18' flows out the bleed hole or holes, the voids should have been eliminated.

It is desirable in performing the instant method to seal each bleed hole 40 after injection of the filler material has been completed. Any suitable sealing technique known in the art using any conventional sealing device 44 may be used to close the bleed hole or holes 40. Preferably, each bleed hole 40 is soldered closed. Although not necessary, the feed hole 38 may be sealed, if desired.

Figure 5:
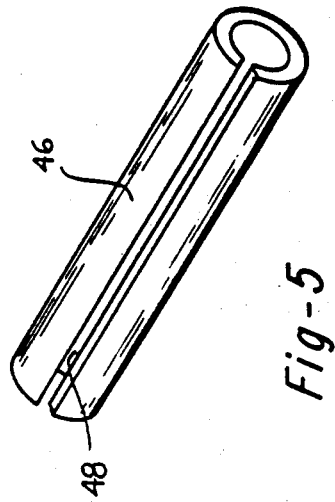
FIG. 5 is a perspective view of a tubular member to be used as an outer sleeve.

As a final step to the method of the instant invention, a concentric outer sleeve 46 is fabricated about the ferrule 30. The outer sleeve 46 is primarily intended to provide the cable with a substantially uniform outer dimension; however, where required, it may serve as part of an electrical conductor. As best seen in FIG. 5, the outer sleeve 46 preferably comprises a hollow substantially circular, split tubular member having a longitudinal seam 48. A split tubular member is preferably used so that it may be easily fitted about the ferrule 30.

Depending upon its function or functions, the outer sleeve 46 may be formed from either a metallic or non-metallic material. For example, sleeve 46 may be a formed epoxy, polyester or other suitable plastic material. Obviously when used as part of a conductor, sleeve 46 is formed from a metallic material such as stainless steel, copper or a copper alloy. Preferably, sleeve 46 comprises a copper or copper alloy member.

Sleeve 46 preferably has a length substantially equal to the gap between the tubes 16. It should also have an outside diameter with the seam 48 closed substantially equal to the outer diameter of the tubes 16 and an inner diameter with the seam 48 closed slightly greater than the ferrule outer diameter. In performing the instant invention, it has been found to be desirable for reasons to be discussed hereinafter to avoid a snug fit between the outer sleeve 46 and the ferrule 30. Preferably, there is a clearance of about 0.001" to about 0.01" between the ferrule 30 and the sleeve 46.

After the sleeve 46 has been positioned over the ferrule 30, the seam 48 is preferably sealed. The sleeve 46 should be positioned over the ferrule 30 so that the seam 48 does not overlap feed hole 38. Preferably, the seam 48 is located about 180° opposed from the feed hole 38. The seam 48 may be sealed using any suitable sealing technique such as soldering, brazing or applying an epoxy adhesive and any suitable sealing means 50 known in the art. Preferably, the seam 48 is soldered closed.

After the seam has been sealed, the sleeve 46 may be bonded to the tubes 16. Here again, any suitable sealing technique and device known in the art may be used. The selected bonding technique should preferably cause a bonding or sealing material 52, such as solder, a brazement or epoxy, to flow into the clearance between the sleeve 46 and the ferrule 30. By allowing the sealing material 52 to flow into the clearance, the tensile breaking strength of the repair patch or connection joint may be optimized. In a preferred embodiment, the outer sleeve 46 is soldered to each tube 16.

The sleeve 46 should have an outer shape and an outer diameter consistent with those of the tubes 16. However, if needed, the outer sleeves 46 may be subjected to any conventional technique known in the art for reducing its outer diameter and/or conforming its outer shape to the shape of the tubes 16. For example, sleeve 46 may be swaged using any suitable swaging apparatus 54 known in the art.

In lieu of using a preformed, split tubular member, the outer sleeve 46 may be fabricated by wrapping a tape not shown of suitable material about the ferrule 30. The ends of the tape may be fastened to each tube 16 by any suitable means known in the art. After the repair patch or connection joint has been completed, the repaired or joined cable may be released from the holding devices 22. Thereafter, one or more external layers not shown may be fabricated about the cable. For example, one or more layers of a suitable plastic or plastic materials may be extruded about the cable.

The solder preferably used to join the ferrule 30 to tubes 16, to seal the seam 48, and to bond the outer sleeve 46 to the tubes 16 may comprise any suitable solder known in the art. For example, it may comprise a 60% tin-40% lead solder.

The repair patch or connection joint fabricated by the method of the instant invention should be almost indistinguishable from the remainder of the cable. The repair patch or connection joint should have mechanical strength characteristics closely resembling or better than those of the original cable and should provide a hermetic seal for protecting the optical fiber or fibers from OH⁻ degradation.

The plate set forth in the specification are intended to be incorporated by reference herein.

It is apparent that there has been provided in accordance with this invention an optical fiber cable repair and joining technique and a kit for performing the same which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A method for repairing or joining together optical fiber cables, said method comprising:
   providing at least two spaced-apart cable portions, each cable portion comprising a metal tube having an inner and an outer diameter and at least one optical fiber within said tube, each fiber having an exposed end extending beyond said tube;
   providing a hollow metallic tubular member having an outer diameter adapted to fit within the inner diameter of each said tube;
   inserting said tubular member into a first one of said tubes so that said tubular member surrounds said at least one fiber in said first tube;
   splicing together said fiber ends to form at least one length of joined optical fiber;
   moving said tubular member over said spliced fiber ends and into an overlapping relationship with each said tube, said moving step forming an intersurface region between each tube and said member;
   bonding said tubular member to each said tube to form a connection joint between said tubes; and
   forming an outer sleeve having a length substantially equal to the distance between said tubes around said tubular member and an outer diameter substantially equal to the outer diameter of said said tube, said outer sleeve serving as a continuation of said tubes.

2. The method of claim 1 wherein said cable portion providing step comprises:
   providing a single length of optical fiber cable having a single length of metal tube and at least one fiber within said tube; and
   removing a section of said metal tube to form said at least two spaced apart metal tubes and to expose said at least one optical fiber.

3. The method of claim 1 further comprising:
   removing at least some of any filler material in each of said tubes for providing substantially clean internal tube areas into which said tubular member can be inserted, said removal of said filler material creating a void in each said tube.

4. The method of claim 3 further comprising:
   providing said tubular member with a hole in one of its sidewalls; and
   injecting a replacement filler material into said tubular member through said hole to substantially eliminate said tube voids and to substantially fill the internal area of said tubular member.

5. The method of claim 4 further comprising:
   providing each said tube with a bleed hole for permitting air within said tubular member and said tubes to escape thereby substantially avoiding the formation of air bubbles within said tubular member and said tubes; and
   sealing each said bleed hole after said injection of said filler material has been completed.

6. The method of claim 1 further comprising:
   bonding said outer sleeve to each said tube.

7. The method of claim 6 wherein said sleeve forming step comprises:
   swaging said outer sleeve so that said outer diameter of said sleeve is substantially equal to the outer diameter of said tubes and so that said sleeve has an outer shape substantially corresponding to the outer shape of said tubes.

8. The method of claim 6 wherein said outer sleeve forming step comprises:
   providing a hollow tubular sleeve having a longitudinal seam;
   positioning said sleeve about said tubular member; and
   sealing said seam,
   whereby said tubular sleeve with said seam sealed has an outer diameter substantially equal to the outer diameter of each said tube and an inner diameter slightly larger than said tubular member outer diameter so that a gap is formed between said outer sleeve and said tubular member.

9. The method of claim 8 wherein:
   said tubular member bonding step comprises flowing a first sealing material into said intersurface regions to form a lap joint between said tubular member and each said tube; and
   said outer sleeve bonding step comprises flowing a second sealing material into said gap between said outer sleeve and said tubular member,
   whereby said bonding steps provide said connection with an optimal mechanical strength.

10. The method of claim 9 further comprising:
    each of said first and second sealing materials being a solder material;

said tubular member bonding step further comprising soldering said tubular member to each tube; and said outer sleeve bonding step further comprising soldering said outer sleeve to each tube.

11. The method of claim 10 wherein said seam sealing step comprises soldering said seam closed.

12. The method of claim 1 further comprising:
removing at least some of any buffer material surrounding said fiber ends prior to splicing said fiber ends together.

13. A kit for joining together at least two lengths of optical fiber cable, each cable length comprising a metal tube having an outer diameter and an inner diameter and at least one optical fiber and a filler material within said tube, each fiber having an exposed end extending beyond said tube, said kit comprising:
a hollow metallic tubular member having an outer diameter slightly less than the inner diameter of each said tube for permitting said tubular member to be telescopically inserted into each tube to bridge a gap between said tubes, said tubular member having a hole for inserting a replacement filler material into at least said tubular member; and
means for bonding said tubular member to each said tube to form a connection joint between said tubes.

14. The kit of claim 13 further comprising:
means for splicing together said exposed fiber ends to form at least one unitary length of optical fiber.

15. The kit of claim 14 further comprising:
means for removing at least some of any buffer material surrounding said fiber ends.

16. The kit of claim 14 further comprising:
means for removing at least some of said filler material within each tube for permitting said tubular member to be inserted into said tubes, said removal of said filler material creating a void in each tube.

17. The kit of claim 16 further comprising:
means for injecting said replacement filler material into said tubular member, said replacement filler material substantially eliminating said void in each tube, substantially filling the internal area of said tubular member and substantially surrounding said spliced fiber ends.

18. The kit of claim 13 further comprising:
an outer sleeve for placement about said tubular member; and
means for bonding said outer sleeve to each said tube.

19. The kit of claim 18 further comprising:
means for swaging said outer sleeve so that said outer sleeve has an outer diameter substantially equal to the outer diameter of each said tube and an outer shape substantially corresponding to the shape of each tube.

20. The kit of claim 18 wherein said outer sleeve comprises:
a split tubular member having a longitudinal seam.

21. The kit of claim 18 wherein:
said tubular member bonding means and said outer sleeve bonding means each comprises a soldering apparatus.

22. The kit of claim 18 further comprising:
said tubular member being formed from a high strength material selected from the group consisting of copper alloys, steel and stainless steel; and
said outer sleeve being formed from a metal or metal alloy,
said tubular member serving primarily as a strength member and said outer sleeve serving as part of an electrical conductor.

23. The kit of claim 18 further comprising:
means for forming said cable lengths from a single length of cable having a single metal tube and at least one optical fiber and a filler material within said single tube, said forming means comprising means for removing a section of said single metal tube to expose said at least one optical fiber; and
said tubular member and said outer sleeve forming a repair patch for said single metal tube.

24. An optical fiber cable for use in communication applications, said cable comprising:
at least two spaced apart metal or metal alloy tubes;
each of said tubes containing at least one optical fiber;
each said optical fiber in a first one of said tubes being joined to a corresponding optical fiber in a second one of said tubes;
a hollow metallic ferrule located within and bonded to each tube, said ferrule being in an overlapping relationship with each tube and bridging a gap between said tubes;
said joined fibers passing through said ferrule;
an outer sleeve concentrically surrounding a portion of said ferrule, said outer sleeve having a length substantially equal to that portion of the ferrule not in overlapping relationship with said tubes; and
said outer sleeve being bonded to each of said tubes, whereby said ferrule and said outer sleeve form a connection joint between said tubes.

25. The optical fiber cable of claim 24 further comprising:
said outer sleeve having an outer periphery substantially corresponding to the outer periphery of said tubes for forming a substantially continuous surface for said cable.

26. The optical fiber cable of claim 24 further comprising:
said ferrule having an outer diameter adapted to fit within the inner diameter of each tube for forming an intersurface region with each tube; and
a sealing material in each said intersurface region for forming a lap joint between said ferrule and each said tube.

27. The optical fiber cable of claim 24 further comprising:
said ferrule being formed from a high strength material selected from the group consisting of copper alloys, steel and stainless steels; and
said outer sleeve being formed from a metal or metal alloy,
whereby said ferrule serves primarily as a strength member and said outer sleeve and said tubes serve as an electrical conductor.

28. The optical fiber cable of claim 24 further comprising:
filler material located within said ferrule and said tubes.

29. The optical fiber cable of claim 24 further comprising:
said outer sleeve having an inner periphery spaced from the outer periphery of said ferrule; and
a sealing material being located in said space between said outer sleeve and said ferrule to improve the strength of said connection joint.

30. The optical fiber cable of claim 24 further comprising:

said ferrule and said outer sleeve being soldered to each said tube.

31. An optical fiber cable for use in communication applications, said cable comprising:
at least two spaced apart metal or metal alloy tubes;
each of said tubes containing at least one optical fiber;
each said optical fiber in a first one of said tubes being joined to a corresponding optical fiber in a second one of said tubes; and
a hollow metallic ferrule located within each tube, said ferrule being in an overlapping relationship with each tube for bridging a gap between said tubes and having a hole for inserting a filler material into said ferrule and said tubes.

32. The optical fiber cable of claim 31 further comprising:
means for sealing said hole.

* * * * *